United States Patent
Papin et al.

(10) Patent No.: US 12,098,690 B2
(45) Date of Patent: Sep. 24, 2024

(54) ASSEMBLY FOR AN AIRCRAFT TURBINE ENGINE, COMPRISING MEANS FOR THE AXIAL AND RADIAL RETENTION OF A FAN

(71) Applicant: SAFRAN AIRCRAFT ENGINES, Paris (FR)

(72) Inventors: Thierry Georges Paul Papin, Moissy-Cramayel (FR); Didier Gabriel Bertrand Desombre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/043,749

(22) PCT Filed: Sep. 1, 2021

(86) PCT No.: PCT/FR2021/051504
§ 371 (c)(1),
(2) Date: Mar. 2, 2023

(87) PCT Pub. No.: WO2022/049342
PCT Pub. Date: Mar. 10, 2022

(65) Prior Publication Data
US 2023/0349343 A1 Nov. 2, 2023

(30) Foreign Application Priority Data
Sep. 3, 2020 (FR) .................................. 2008938

(51) Int. Cl.
*F02K 3/06* (2006.01)
*F02C 7/36* (2006.01)

(52) U.S. Cl.
CPC .................. *F02K 3/06* (2013.01); *F02C 7/36* (2013.01); *F05D 2220/36* (2013.01); *F05D 2260/40311* (2013.01)

(58) Field of Classification Search
CPC ................... F02K 3/06; F05D 2220/36; F05D 2260/40311
See application file for complete search history.

(56) References Cited

U.S. PATENT DOCUMENTS

2013/0195604 A1* 8/2013 Otto ........................ F02C 3/107
415/124.2
2013/0312419 A1* 11/2013 Merry ....................... F02C 7/06
60/726

(Continued)

FOREIGN PATENT DOCUMENTS

| FR | 3092884 A1 | 8/2020 |
|----|------------|--------|
| WO | 2019158883 A1 | 8/2019 |

OTHER PUBLICATIONS

International Search Report for issued in Application No. PCT/FR2021/051504 dated Jan. 7, 2022.
Written Opinion for PCT/FR2021/051504 dated Jan. 7, 2022.

*Primary Examiner* — J. Todd Newton
*Assistant Examiner* — Aye S Htay
(74) *Attorney, Agent, or Firm* — Pearne & Gordon LLP

(57) ABSTRACT

An assembly for an aircraft turbine engine, includes a fan, a speed reduction gear and an intermediate casing including an internal annular structure that houses an epicyclic gear train equipped with a planet carrier. The assembly includes a secondary retention device for the ring gear of the planet carrier, the device including: first projections that project radially inwards from the internal annular structure, each first projection having a recess that is open radially inwards, axially downwards and circumferentially in a first direction; and second projections that project radially outwards from the ring gear of the planet carrier and cooperate with the first projections in such a way that each second projection is partially accommodated in the recess of the first projection with which it is associated and downstream therefrom.

12 Claims, 4 Drawing Sheets

(56) References Cited

U.S. PATENT DOCUMENTS

2013/0320185 A1    12/2013  Husband et al.
2016/0369648 A1*  12/2016  Otto ..................... F04D 29/053
2017/0122426 A1*   5/2017  Miller ................ F16H 57/0006
2021/0087977 A1*   3/2021  Becoulet ................... F02C 7/36
2021/0317788 A1*  10/2021  Simon .................. F16H 57/082

* cited by examiner

ASSEMBLY FOR AN AIRCRAFT TURBINE ENGINE, COMPRISING MEANS FOR THE AXIAL AND RADIAL RETENTION OF A FAN

This is the National Stage of PCT international application PCT/FR2021/051504, filed on Sep. 1, 2021 entitled "ASSEMBLY FOR AN AIRCRAFT TURBINE ENGINE, COMPRISING MEANS FOR THE AXIAL AND RADIAL RETENTION OF A FAN", which claims the priority of French Patent Application No. 2008938 filed Sep. 3, 2020, both of which are incorporated herein by reference in their entireties.

TECHNICAL FIELD

The present invention relates to the field of aircraft turbine engines, and in particular to dual flow and/or dual body turbine engines, for example turbojet engines.

The invention relates in particular to turbine engines comprising a fan driven by a speed reducer.

PRIOR ART

In aircraft turbine engines, it is known to provide a fan driven by a speed reducer, so as to limit the rotational speed of the fan relative to that of the low-pressure body. In a so-called planetary configuration, the reducer comprises an inner ring driven by the low-pressure body, a planetary carrier attached to the stator of the turbine engine, and an outer ring gear joined to a fan shaft. The planetary gears mesh with both the inner and outer rings of the epicyclic gear train. Such a configuration is known for example from document WO 2019/158883.

The fan shaft is generally retained axially by a bearing, which is itself supported by a bearing support connected to the stator part of the turbine engine. The bearing includes a stop which prevents the fan shaft from moving axially, in the direction from downstream to upstream.

In the event of failure of the bearing or bearing support, the fan is subject to the risk of moving axially in upstream direction. There is therefore a need to provide a configuration which limits/avoids this risk.

DESCRIPTION OF THE INVENTION

To address this problem, the subject-matter of the invention is first of all an assembly for an aircraft turbine engine, the assembly comprising a fan, a speed reducer driving the fan and located downstream thereof, an intermediate casing including an inner annular structure internally delimiting a cavity accommodating at least partly the reducer, the latter comprising an epicyclic gear train equipped with a planetary carrier, one ring of which is fixed to the inner annular structure of the intermediate casing by means of a main retaining device.

According to the invention, the assembly includes a secondary retaining device of the ring of the planetary carrier relative to the inner annular structure of the intermediate casing, the secondary retaining device comprising:

first projections projecting radially inwardly from the inner annular structure of the intermediate casing, the first projections being spaced apart circumferentially from one another about a longitudinal axis of the turbine engine, each first projection having a recess open radially inwardly, open axially downstream, and open circumferentially in a first circumferential direction, and delimited by three faces, respectively an axial retaining face, a radial retaining face as well as a circumferential retaining face;

second projections projecting radially outwardly from the ring of the planetary carrier, the second projections being spaced apart circumferentially from one another about the longitudinal axis of the turbine engine, and cooperating in pairs with the first projections in such a way that each second projection is housed partially in the recess of its associated first projection, downstream thereof.

The invention addresses the problem in a simple and reliable way by creating cooperative stops between radial projections, which form a cogging type connection. In particular, by axially and radially retaining the planetary carrier of the speed reducer, the fan is also retained axially and radially with respect to the inner annular structure of the intermediate casing, in the event of failure of the support bearing of the fan shaft or failure of the support of this bearing. The invention thus cleverly provides for acting on the planetary carrier of the reducer to prevent/limit axial and radial movements of the fan in the event of failure.

Furthermore, the cooperation between the first and second radial projections also ensures advantageously a transmission of the torque of the reducer/fan to the inner annular structure of the intermediate casing. This torque transmission in circumferential direction, through radial projections, can be observed continuously, or only in the event of failure as mentioned above. The circumferential clearance between the first and second projections is preferably zero, or very small, but alternatively it can be greater, without departing from the scope of the invention.

However, the axial and radial clearances between the first and second radial projections are preferably greater, in order to limit the transmission of vibrations to the reducer during normal operation of the turbine engine.

The invention preferably provides at least one of the following optional features, considered individually or in combination.

As mentioned above, the assembly is configured such that in a normal operating configuration of the turbine engine, a radial clearance is defined between each second projection and the radial retaining face delimiting the recess of the first projection with which it cooperates and/or an axial clearance is defined between each second projection and the axial retaining face delimiting this recess, and/or a circumferential clearance is defined between each second projection and the circumferential retaining face delimiting this recess.

Preferably, the inner annular structure of the intermediate casing is made in one piece, with the first projections, preferably by casting.

Preferably, the main retaining device includes a flexible half-section annular part in the general shape of a radially outwardly open U, the upstream leg of the U being attached to the ring of the planetary carrier, and the downstream leg of the U being attached to a flange of the inner annular structure of the intermediate casing, projecting radially inwardly.

Preferably, the number of first projections is between three and fifteen, and preferably between six and ten.

Preferably, the epicyclic gear train includes an outer ring gear meshing with planetary gears of the planetary carrier, the outer ring gear being joined to a fan shaft.

Preferably, the fan shaft is supported by a bearing which ensures its axial retention in the direction from downstream to upstream.

Preferably, the bearing is supported by a bearing support fixed to a stator part of the assembly, and preferably the inner annular structure of the intermediate casing.

Preferably, the intermediate casing also includes an outer annular structure connected to the inner annular structure by radial arms, the annular space between the two inner and outer annular structures forming part of a primary flow path of the turbine engine.

A further subject-matter of the invention is an aircraft turbine engine comprising such an assembly, the turbine engine being preferably a dual flow and dual body turbojet engine. Other features and advantages of the invention are given in the non-limiting detailed description given below.

BRIEF DESCRIPTION OF THE DRAWINGS

This description will be given with reference to the appended drawings, in which.

DETAILED DESCRIPTION OF PREFERRED EMBODIMENTS

Figure 1:
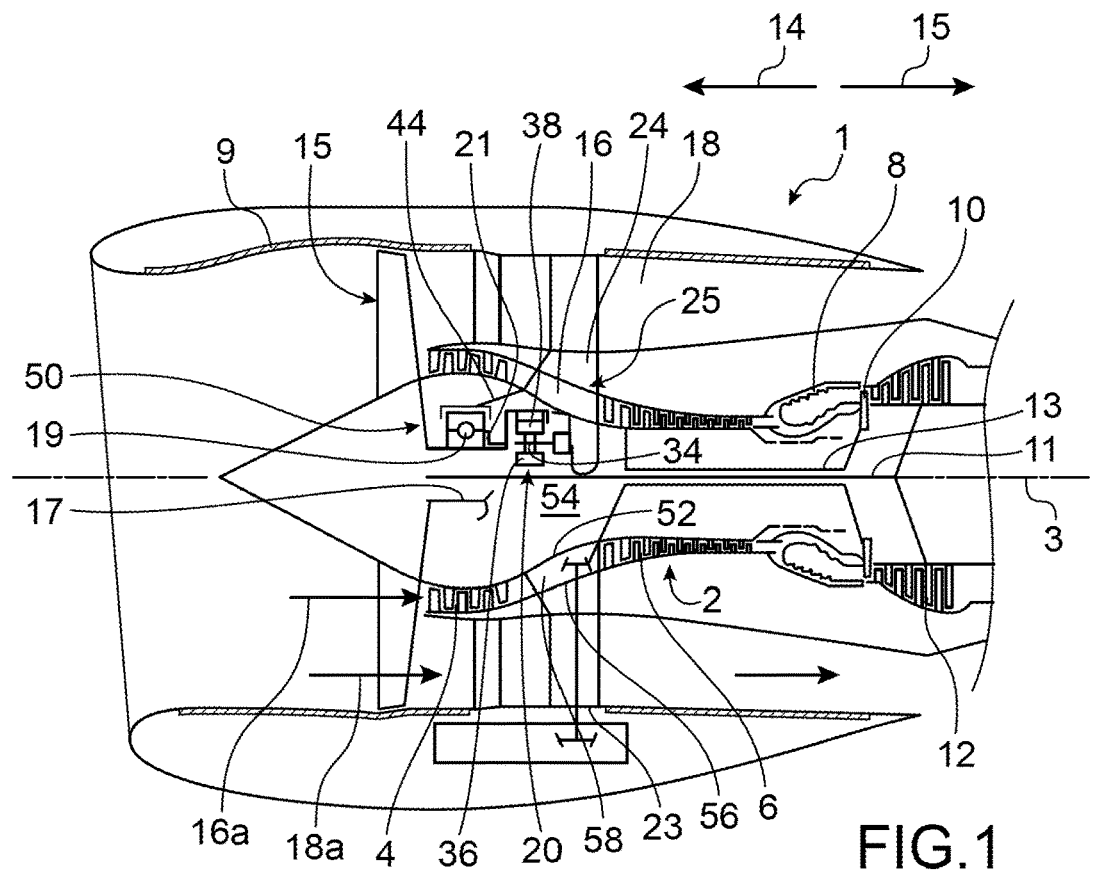
FIG. 1 shows a schematic side view of a turbojet engine according to the invention.

With reference to FIG. 1, a dual flow and dual body turbojet engine 1 is shown, preferably with a high bypass ratio. The turbojet engine 1 generally has a gas generator 2 on either side of which are arranged a low-pressure compressor 4 and a low-pressure turbine 12, this gas generator 2 comprising a high-pressure compressor 6, a combustion chamber 8 and a high-pressure turbine 10. In the following, the terms "front" and "back" are defined in a direction 14 opposite the main flow direction of the gases inside the turbojet engine, this direction 14 being parallel to the longitudinal axis 3 thereof. In contrast, the terms "upstream" and "downstream" are defined according to the main flow direction of the gases inside the turbojet engine, referenced 15.

The low-pressure compressor 4 and the low-pressure turbine 12 form a low-pressure body, and are connected to one another by a low-pressure shaft 11 centred on the axis 3.

Similarly, the high-pressure compressor 6 and the high-pressure turbine 10 form a high-pressure body, and are connected to one another by a high-pressure shaft 13 centred on the axis 3 and arranged about the low-pressure shaft 11. The shafts are supported by roller bearings (not shown), which are lubricated by being arranged in oil enclosures. The same applies to a fan shaft 17, also referred to as a fan hub, which is supported by a number of roller bearings 19, one of which is partially represented in FIG. 1. This roller bearing 19 thus supports the fan shaft 17, comprising an axial stop 21 preventing the shaft 17 and the fan 15 from moving axially upstream relative to the stator part of the turbojet engine. It is therefore a bearing 19 for the axial retention of the fan in the axial direction, this bearing also being referred to as a thrust bearing. It is itself supported by a bearing support 44, fixed to the stator part of the turbojet engine.

The turbojet engine 1 further includes, at the front of the gas generator 2 and the low-pressure compressor 4, a single fan 15 which is here arranged directly behind an air inlet cone of the engine. The fan 15 is rotatable about the axis 3, and surrounded by a fan casing 9. The fan 15 is driven by a speed reducer 20 via the fan shaft 17, which allows it to rotate at a lower speed than the low-pressure body.

In addition, the turbojet engine 1 defines a primary flow path 16 intended to be flowed through by a primary flow 16a, as well as a secondary flow path 18 intended to the flowed through by a secondary flow 18a located radially outwardly from the primary flow, wherein the flow from the fan is divided.

Downstream of the fan 15, in the secondary flow path 18, a ring of guide vanes is provided which in this case are outlet guide vanes (OGV) 24. These stator vanes 24 connect an outer casing element, here an outer shell 23, to an inner casing element corresponding here to an intermediate casing 25, arranged axially between the two compressors 4 and 6. Preferably, the bearing support 44 is fixed onto the intermediate casing 25, preferably onto an inner annular structure thereof, on or near an upstream end of this structure.

Figure 2:
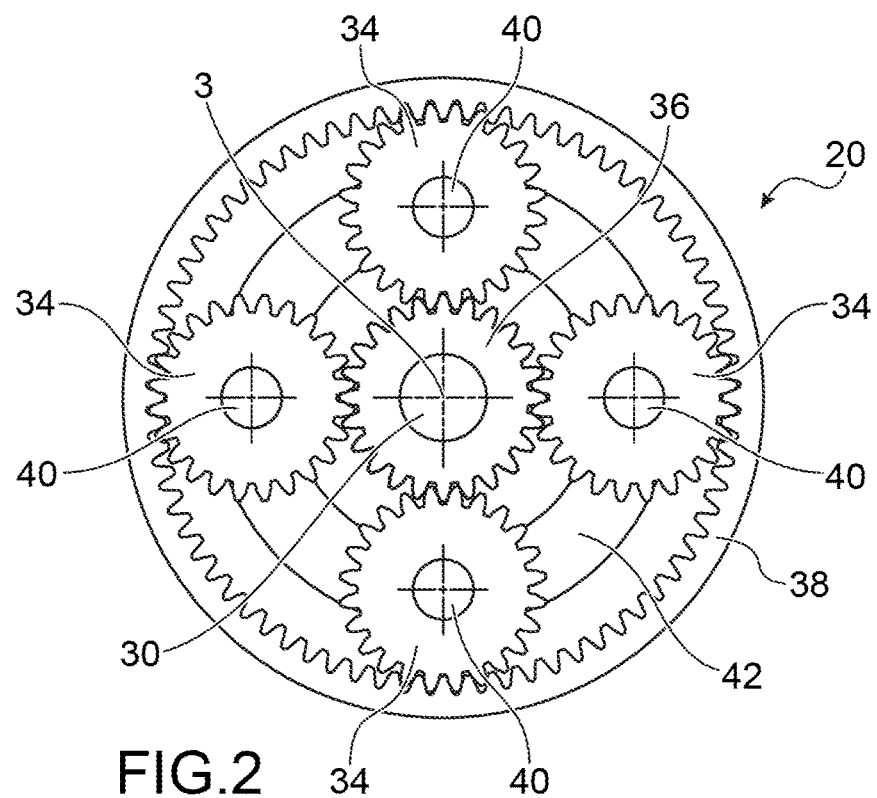
FIG. 2 shows an enlarged view, in more detail, of the reducer fitted to the turbojet engine shown in the preceding figure.

With reference to FIGS. 1 and 2 the reducer 20 will now be described which comprises an epicyclic gear train. More precisely, this epicyclic gear train includes planetary gears 34 meshing with an inner planetary gear 36, also referred to as a central gear or inner ring.

The planetary gears 34 also mesh with an outer planetary gear 38, also referred to as the outer ring. The inner 36 and outer 38 planets are coaxial to the axis 3 of the turbojet engine. Each planetary gear 34 is mounted to be freely rotatable about a pivot 40, and the pivots 40 are integral with a planetary carrier 42.

In this planetary reducer 20, the inner ring 36 is connected in rotation with the low-pressure shaft 11, which forms an input of a gear train. The planetary carrier 42 is fixed to the stator part of the turbojet engine, while the outer ring gear 38 is joined to the fan shaft 17, forming a speed reduction output of the epicyclic gear train.

Figure 3:
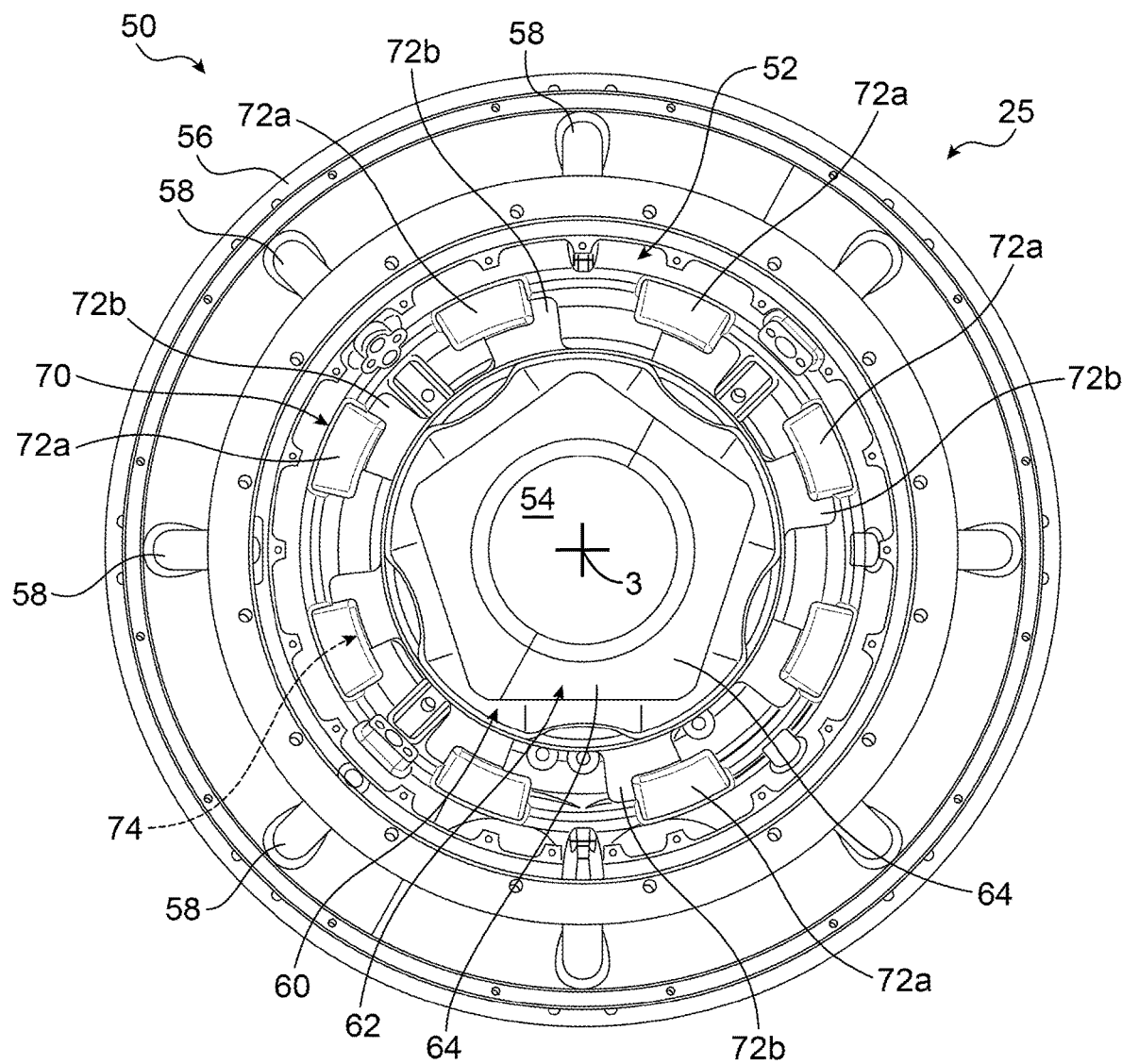
FIG. 3 is a front view of the intermediate casing forming an integral part of an assembly according to a preferred embodiment of the invention, used in the turbojet engine of FIG. 1.
Figure 4:
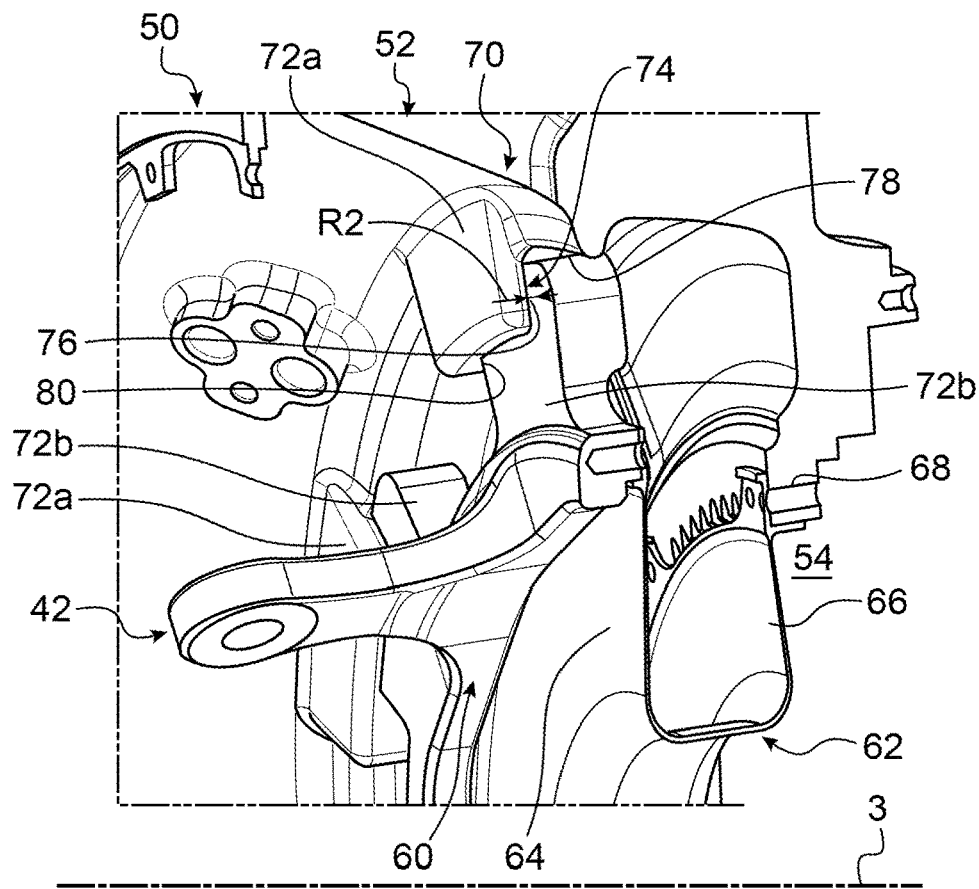
FIG. 4 is a perspective view of part of the assembly.
Figure 5:
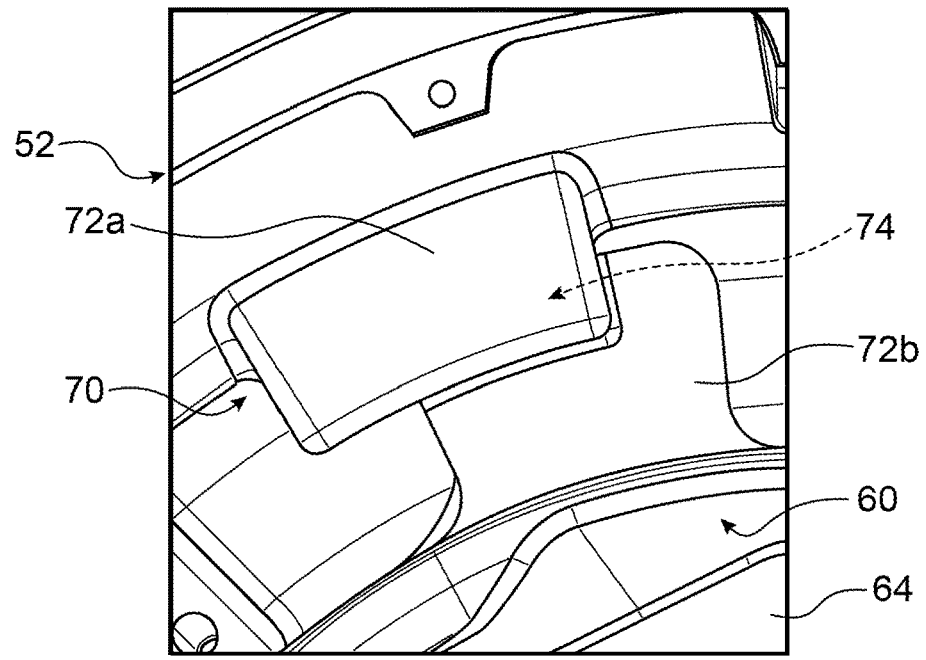
FIG. 5 is a perspective view of part of the assembly, from a different angle.
Figure 6:
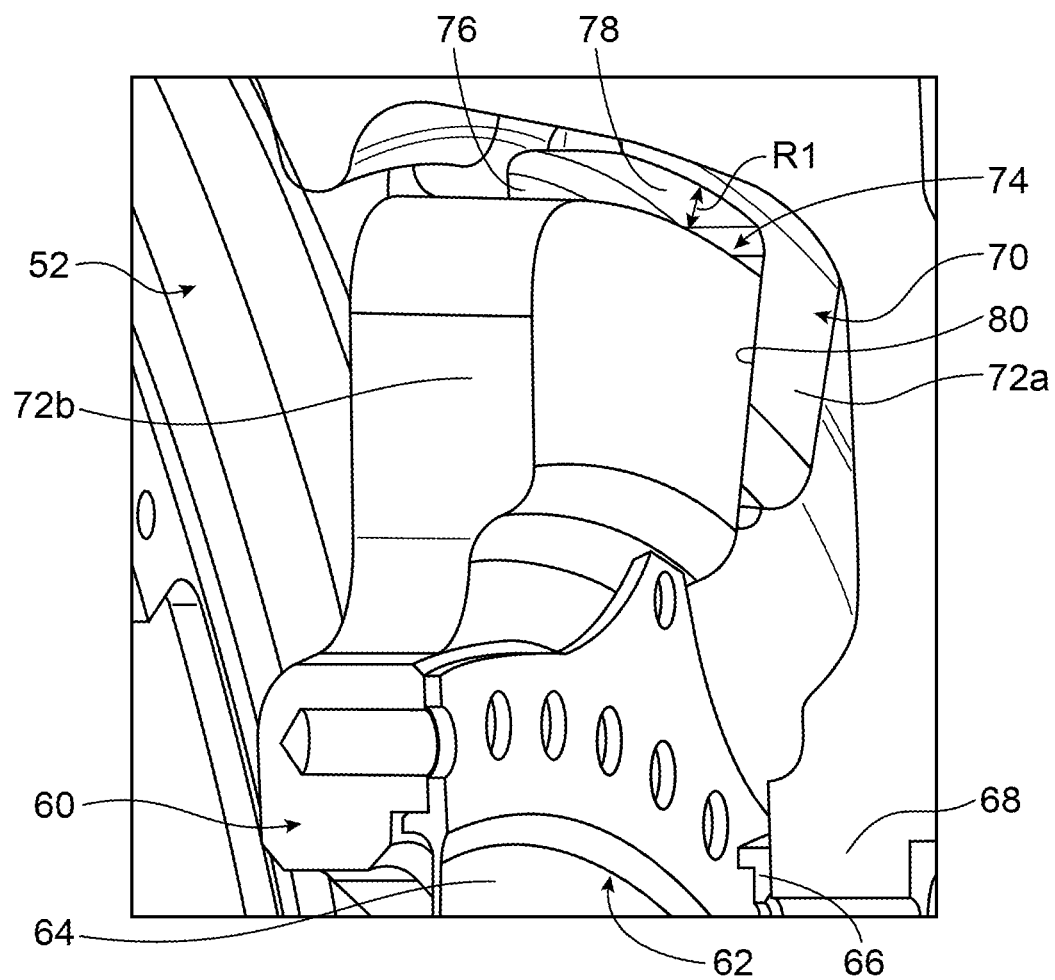
FIG. 6 is a perspective view of part of the assembly, from yet another angle.

The invention relates to a turbojet engine assembly 50, which includes the fan 15, the speed reducer 20 arranged downstream of the fan, as well as the intermediate casing 25. With reference to FIGS. 1 and 3, the intermediate casing 25 has an inner annular structure 52 delimiting internally a cavity 54 centred on the axis 3, housing at least a portion of the reducer 20. The casing 20 also comprises an outer annular structure 56, connected to the inner annular structure by radial arms 58 spaced apart circumferentially from one another. The annular space between the two inner and outer annular structures 52, 56 form a part of the primary flow path 16 of the turbojet engine.

With reference to FIGS. 3 to 6, it is first of all noted that the ring 60 of the planetary carrier 42 is secured to the inner annular structure 52 by a main retaining device 62. This includes a flexible, generally U-shaped radially outwardly open half-section ring. The upstream leg 64 of the U is fixed to the ring 60 of the planetary carrier, preferably by a circumferential row of bolts. Similarly, the downstream leg 66 of the U is fixed to a flange 68 of the inner annular structure 52 of the intermediate casing 25, also preferably by a circumferential row of bolts. The flange 68 is located at a downstream end of the inner annular structure 52, projecting radially inwardly, and thereby delimiting the cavity 54 downstream.

Due to the flexibility of the generally U-shaped main retaining device 62, vibrations from the stator part of the turbojet engine are partially filtered out, and not transmitted to the reducer 20, which advantageously improves the life of the reducer, in particular with respect to the wear of the teeth. During the normal operation of the turbojet engine, it is essentially axial and radial vibrations which are filtered out by the generally U-shaped main retaining device 62, and not transmitted to the ring 60 of the planetary carrier 42. In the event of failure of the axial retention of the fan 15, for example due to a failure of the roller bearing 19 or its bearing support 44, there is a risk of forward movement of this same fan. To overcome this disadvantage, one of the features of the invention is the use of a secondary retaining device of the ring 60 of the planetary carrier, capable of axially retaining the fan upstream in the event of a failure such as those described above. Furthermore, this secondary retaining device 70 is not only configured to limit the axial movements of the ring 60/fan 15 relative to the inner annular structure 52 of the intermediate casing, but also the radial displacements in case of a significant imbalance of the fan. Furthermore, this secondary retaining device 70 is also designed to ensure the transmission of the torque of the reducer/fan, towards the inner annular structure 52 of the intermediate casing 25. This torque transmission in circumferential direction can be observed continuously or only in the event of a failure of the aforementioned type. For implementing the secondary retaining device 70, first of all first projections 72a are provided projecting radially inwardly from the inner annular structure 52 of the intermediate casing. The first projections 72a are spaced apart circumferentially from one another about the axis 3. They have the form of cogging or teeth, for example provided in a number between six and ten, spaced apart evenly in circumferential direction. The first projections 72a are made in one piece with the whole inner annular structure 52 of the intermediate casing 25, preferably by casting.

Each first projection 72a has a recess 74 formed at a distal end of this projection. The recess 74 is open radially inwardly, open axially downstream, and open circumferentially in a first circumferential direction, for example clockwise in a front view. Facing these three openings, the recess 74 is delimited by three faces, respectively an axial retaining face 76, a radial retaining face 78, as well as a circumferential retaining face 80. These three adjacent retaining faces 76, 78, 80 are substantially perpendicular to one another and they thus form a sort of trunk corner intended to cooperate with second projections 72b, forming an integral part of the secondary retaining device 70.

Indeed, the second projections 72b project radially outwardly from the ring 60 of the planetary carrier, preferably made in one piece with the same ring. The second projections 72b are spaced apart circumferentially from one another about the axis 3. They also have the form of cogging or teeth, provided in the same number as the first projections 72b, and spaced apart evenly in circumferential direction.

They cooperate in pairs with the first projections 72a, such that the distal end of each second projection 72b is partly received in the recess 74 of its first associated projection 72a, downstream thereof.

The angular extension of the first and second projections 72a, 72b is preferably identical or similar.

In the normal operating configuration of the turbojet engine, a radial clearance R1 is defined between each second projection 72b and the radial retaining face 78 of the first associated projection. This clearance R1 is small, for example between 0.5 and 5 mm. Similarly, an axial clearance R2 of similar identical magnitude is defined between each second projection 72b, and the axial retaining face 76 of the associated first projection. However, preferably no circumferential clearance is provided between each second projection 72b and the circumferential retaining face 80 delimiting the recess 74, or only a small clearance, less than that of clearances R1 and R2.

In the event of failure of the roller bearing 19 or the bearing support 44 supporting the fan shaft 17, the fan 15 tends to move forwards relative to the stator part of the turbojet engine. This movement first of all causes the stator and rotor elements of the reducer 20 to come into contact with one another, and thus dissipate some of the energy associated with the fan. This movement of the fan is mainly transmitted to the ring 60 of the planetary carrier 42, the forward movement of which is stopped quickly by the use of the possible axial clearance R2 between the first and second projections 72a, 72b, which form a cog-like connection becoming active following the observed failure. The same applies to the use of the radial clearance R1, if this failure leads to greater imbalance of the fan but still limited by this functionality of the secondary retaining device 70. Furthermore, the latter continues to ensure the transmission of the torque in the event of failure, through the cooperation between the second projections 72b and the circumferential retaining faces 80 delimiting the recesses 74.

The invention thus makes it possible to provide a compact and simple solution to the problem of a failure in the axial retention of the fan.

Of course, various modifications may be made by the person skilled in the art to the invention as described, by way of non-limiting examples only, the scope of which is delimited by the appended claims.

What is claimed is:

1. An assembly for an aircraft turbine engine, the assembly comprising a fan, a speed reducer driving the fan and located downstream thereof, an intermediate casing including an inner annular structure internally delimiting a cavity at least partially housing the reducer, the reducer comprising an epicyclic gear train equipped with a planetary carrier, one ring of the planetary carrier is fixed to the inner annular structure of the intermediate casing by a main retaining device, wherein the assembly includes a secondary retaining device of the ring of the planetary carrier relative to the inner annular structure of the intermediate casing, the secondary retaining device comprising:

first projections projecting radially inwardly from the inner annular structure of the intermediate casing, the first projections being spaced apart circumferentially from one another about a longitudinal axis of the turbine engine, each first projection having a recess open radially inwardly, open axially downstream, and open circumferentially in a first circumferential direction, and delimited by three faces, respectively an axial retaining face, a radial retaining face, and a circumferential retaining face, wherein the circumferential retaining face extends from both the radial retaining face and the axial retaining face such that the three faces form a corner that delimits the recess;

second projections projecting radially outwardly from the ring of the planetary carrier, the second projections being spaced apart circumferentially from one another about the longitudinal axis of the turbine engine, and cooperating in pairs with the first projections in such a way that each second projection is partly housed in the recess of its associated first projection, downstream thereof, wherein each corner is configured to cooperate with each second projection.

2. The assembly according to claim 1, wherein the assembly is configured such that in a normal operating configuration of the turbine engine, a radial clearance is defined between each second projection and the radial retaining face delimiting the recess of the first projection with which it cooperates, and/or an axial clearance is defined between each second projection and the axial retaining face delimiting this recess, and/or a circumferential clearance is defined between each second projection and the circumferential retaining face delimiting this recess.

3. The assembly according to claim 1, wherein the inner annular structure of the intermediate casing is made in one piece with the first projections.

4. The assembly according to claim 1, wherein the main retaining device includes a generally radially outwardly open U-shaped flexible half-section annular part, the upstream leg of the U being secured to the ring of the planetary carrier, and the downstream leg of the U being secured to a radially inwardly projecting flange of the inner annular structure of the intermediate casing.

5. The assembly according to claim 1, wherein the number of the first projections is between three and fifteen.

6. The assembly according to claim 1, wherein the epicyclic gear train includes an outer ring gear meshing with planetary gears of the planetary carrier, the outer ring gear being connected to a fan shaft.

7. The assembly according to claim 6, wherein the fan shaft is supported by a bearing ensuring its axial retention in the direction from downstream to upstream.

8. The assembly according to claim 7, wherein the bearing is supported by a bearing support attached to a stator part of the assembly.

9. The assembly according to claim 1, wherein the intermediate casing also includes an outer annular structure connected to the inner annular structure by radial arms, the annular space between the two inner and outer annular structures forming part of a primary flow path of the turbine engine.

10. An aircraft turbine engine comprising an assembly according to claim 1, the turbine engine being a dual flow and dual body turbojet engine.

11. The assembly according to claim 1, wherein the number of the first projections is between six and ten.

12. The assembly according to claim 8, wherein the bearing support is attached to the inner annular structure of the intermediate casing.

* * * * *